(12) United States Patent
Kahn

(10) Patent No.: US 7,100,184 B1
(45) Date of Patent: Aug. 29, 2006

(54) METHOD AND APPARATUS FOR RAPID ACCESS OF PROGRAM GUIDE INFORMATION

(75) Inventor: Michael Kahn, Westampton, NJ (US)

(73) Assignee: Matsushita Electric Industrial Company Ltd., Osaka (JP)

( * ) Notice: Subject to any disclaimer, the term of this patent is extended or adjusted under 35 U.S.C. 154(b) by 529 days.

(21) Appl. No.: 09/630,534

(22) Filed: Aug. 3, 2000

(51) Int. Cl.
*H04N 5/445* (2006.01)

(52) U.S. Cl. .............................. 725/39; 725/40; 725/52; 725/53

(58) Field of Classification Search .................. 725/39, 725/52–53, 40
See application file for complete search history.

(56) References Cited

U.S. PATENT DOCUMENTS

| | | | | |
|---|---|---|---|---|
| 5,629,733 | A | * | 5/1997 | Youman et al. ............... 725/53 |
| 5,671,411 | A | * | 9/1997 | Watts et al. ................. 395/615 |
| 5,699,107 | A | * | 12/1997 | Lawler et al. ................. 348/13 |
| 5,726,702 | A | * | 3/1998 | Hamaguchi et al. .......... 725/55 |
| 5,731,844 | A | * | 3/1998 | Rauch et al. ................. 348/563 |
| 5,751,372 | A | * | 5/1998 | Forson ........................ 348/569 |
| 5,793,438 | A | | 8/1998 | Bedard |
| 5,880,768 | A | * | 3/1999 | Lemmons et al. ............. 348/1 |
| 5,886,690 | A | * | 3/1999 | Pond et al. .................. 715/720 |
| 5,986,650 | A | | 11/1999 | Ellis et al. |
| 6,005,565 | A | * | 12/1999 | Legall et al. ................. 345/327 |
| 6,005,601 | A | * | 12/1999 | Ohkura et al. ................. 348/7 |
| 6,016,144 | A | * | 1/2000 | Blonstein et al. ........... 715/791 |
| 6,025,869 | A | * | 2/2000 | Stas et al. ..................... 725/28 |
| 6,040,829 | A | * | 3/2000 | Croy et al. .................. 715/864 |
| 6,057,890 | A | * | 5/2000 | Virden et al. ................. 348/583 |
| 6,128,009 | A | * | 10/2000 | Ohkura et al. .............. 345/327 |
| 6,177,931 | B1 | * | 1/2001 | Alexander et al. ............ 725/52 |
| 6,230,323 | B1 | * | 5/2001 | Hama et al. ................... 725/47 |
| 6,233,734 | B1 | * | 5/2001 | Macrae et al. ................ 725/50 |
| 6,323,911 | B1 | * | 11/2001 | Schein et al. ................ 348/552 |
| 6,347,400 | B1 | * | 2/2002 | Ohkura et al. ................ 725/60 |
| 6,434,621 | B1 | * | 8/2002 | Pezzillo et al. ............. 709/231 |

(Continued)

FOREIGN PATENT DOCUMENTS

CN           1219322         6/1999

(Continued)

OTHER PUBLICATIONS

European Seart Report, Dec. 15, 2003.

*Primary Examiner*—Hai Tran
*Assistant Examiner*—Son P. Huynh
(74) *Attorney, Agent, or Firm*—RatnerPrestia

(57) ABSTRACT

A method for rapidly accessing program guide information is described. The method includes displaying program guide information on a grid showing a channel axis and a time axis, with each program positioned at a location in the grid representing a channel of transmission and a corresponding time of transmission. The method includes the steps of: (a) displaying the program guide information; (b) placing a time selection field on the display; (c) highlighting and activating the time selection field; (d) determining a time index in response to the activating step; (e) calculating a new time of transmission for display based on the time index; and (f) displaying the program guide information at the new time of transmission. The time selection field includes a page field, a day field and a date field. The page field is adapted to provide a six-hour time index, the day field is adapted to provide a 24-hour time index, and the date field is adapted to provide a seven-day time index. The method includes activating the time selection field to index forward in time and backwards in time.

13 Claims, 3 Drawing Sheets

U.S. PATENT DOCUMENTS

| | | | |
|---|---|---|---|
| 6,462,784 B1 * | 10/2002 | Kohno et al. | 348/563 |
| 6,481,010 B1 * | 11/2002 | Nishikawa et al. | 725/44 |
| 6,522,342 B1 * | 2/2003 | Gagnon et al. | 345/716 |
| 6,526,577 B1 * | 2/2003 | Knudson et al. | 725/40 |
| 6,732,372 B1 * | 5/2004 | Tomita et al. | 725/47 |
| 6,754,905 B1 * | 6/2004 | Gordon et al. | 725/38 |
| 2002/0056099 A1 * | 5/2002 | Takahashi et al. | |
| 2002/0100044 A1 * | 7/2002 | Daniels | 725/39 |
| 2003/0066085 A1 * | 4/2003 | Boyer et al | |

FOREIGN PATENT DOCUMENTS

| | | |
|---|---|---|
| WO | WO 89/03085 | 4/1989 |
| WO | WO 99/65242 | 12/1999 |

* cited by examiner

METHOD AND APPARATUS FOR RAPID ACCESS OF PROGRAM GUIDE INFORMATION

TECHNICAL FIELD

The present invention relates, in general, to electronic presentation of television program guide information, and, more specifically, to a method for rapidly accessing the program guide information.

BACKGROUND OF THE INVENTION

There are numerous television channels available for viewing at any particular time. These television channels may contain a variety of programs originating from cable distributors or direct satellite transmissions. The variety of programs complicates the viewer's task in learning what programming is available on a specific channel at a particular time.

A common approach to presenting television programming information is by use of a digital set top box (STB), or as a component of an STB such as a cable decoder, satellite decoder or digital television (DTV) decoder. The set top box presents a menu on a display containing programming information of current and future programs. The program guides typically store between three to seven days of information. In the future, program guides of two weeks to a month may be common place.

An example of a program guide is shown in FIG. 1. As shown, display screen 10 includes program guide 12 with channel panels 16 identifying channels available for viewing. Time panel 14 lists particular times, for example, Thursday with 90 minute increments (e.g. 3:00 PM to 4:30 PM). Program grid 18 lists titles of programs on the identified channels at the listed times.

The channels available may vary depending on the viewer's particular cable system or satellite link, and the service level. Although the viewer may only be interested in certain programs, he or she must nonetheless search through the entire table for programs of interest. Because of the resolution limitations of the display and the viewing distance, the viewer may see, for example, 1.5 hours of programming at a time for six or seven channels.

In order to see different program events on the menu, the viewer may hold a remote control unit including an infrared transmitter for emitting control signals. A directional control keypad on the remote control unit allows the viewer to control movement of a cursor on the programming grid. For example, in order to see events in the future, the viewer may move the cursor to the right. To see events in the past, the viewer may move the cursor to the left. Tiles 20 and 22 indicate to the viewer that the menu continues respectively into the past and into the future. The viewer may also scroll the cursor up or down to see additional channels.

Since the viewer may only scroll forward or backwards in time by 30 minute increments, accessing programming information several days in advance may be very time consuming. For example, displaying the menu six days into the future requires that the viewer scroll for 288 half hour increments. With current technology, it may take over three minutes to access the desired information.

In view of the shortcomings of conventional program guides, improved methods are required for providing more rapid access of future program guide information.

SUMMARY OF THE INVENTION

To meet this and other needs, and in view of its purposes, the present invention provides a method for rapidly accessing program guide information. The method includes displaying program guide information on a grid showing a channel axis and a time axis, with each program positioned at a location in the grid representing a channel of transmission and a corresponding time of transmission. The method includes the steps of: (a) displaying the program guide information; (b) placing a time selection field on the display; (c) highlighting and activating the time selection field; (d) determining a time index in response to the activating step; (e) calculating a new time of transmission for display based on the time index; and (f) displaying the program guide information at the new time of transmission.

According to one aspect of the invention, the time selection field includes a page field, a day field and a date field. The page field is adapted to provide a six-hour time index, the day field is adapted to provide a 24-hour time index, and the date field is adapted to provide a seven-day time index. The method includes activating the time selection field to index forward in time and backwards in time.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
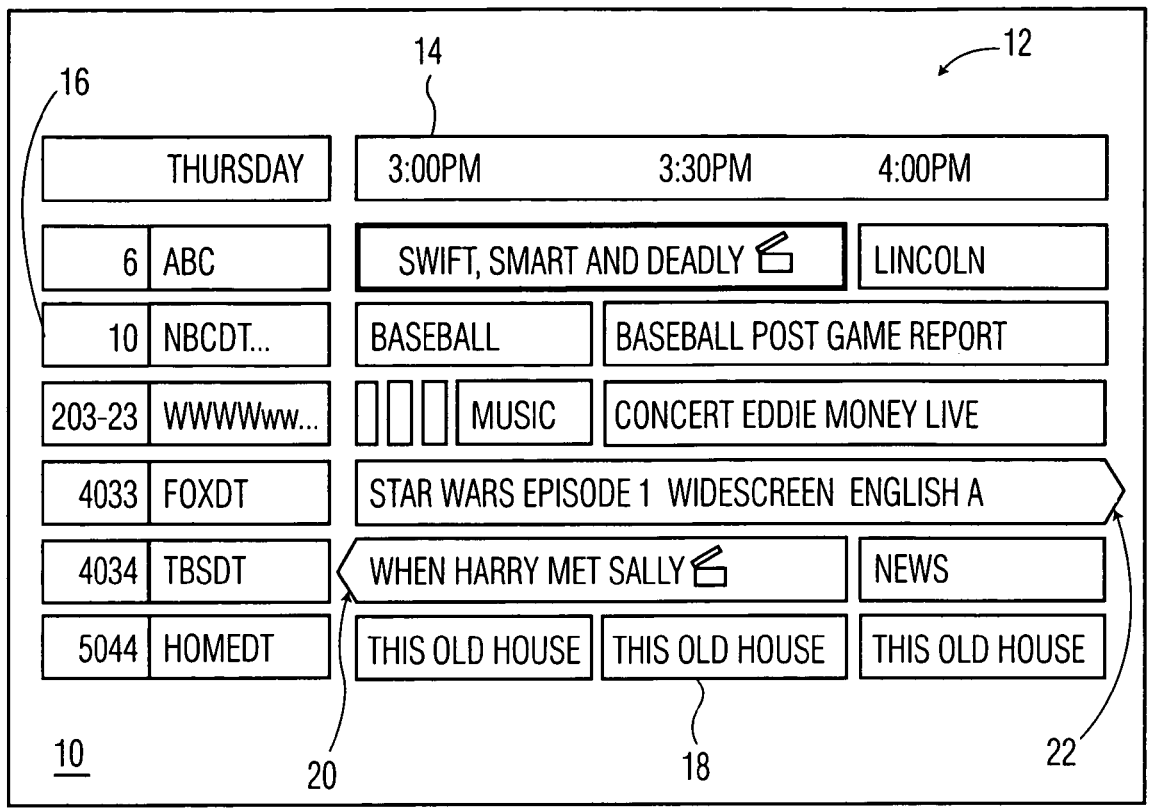
FIG. 1 depicts a prior art display of a program guide.
Figure 2:
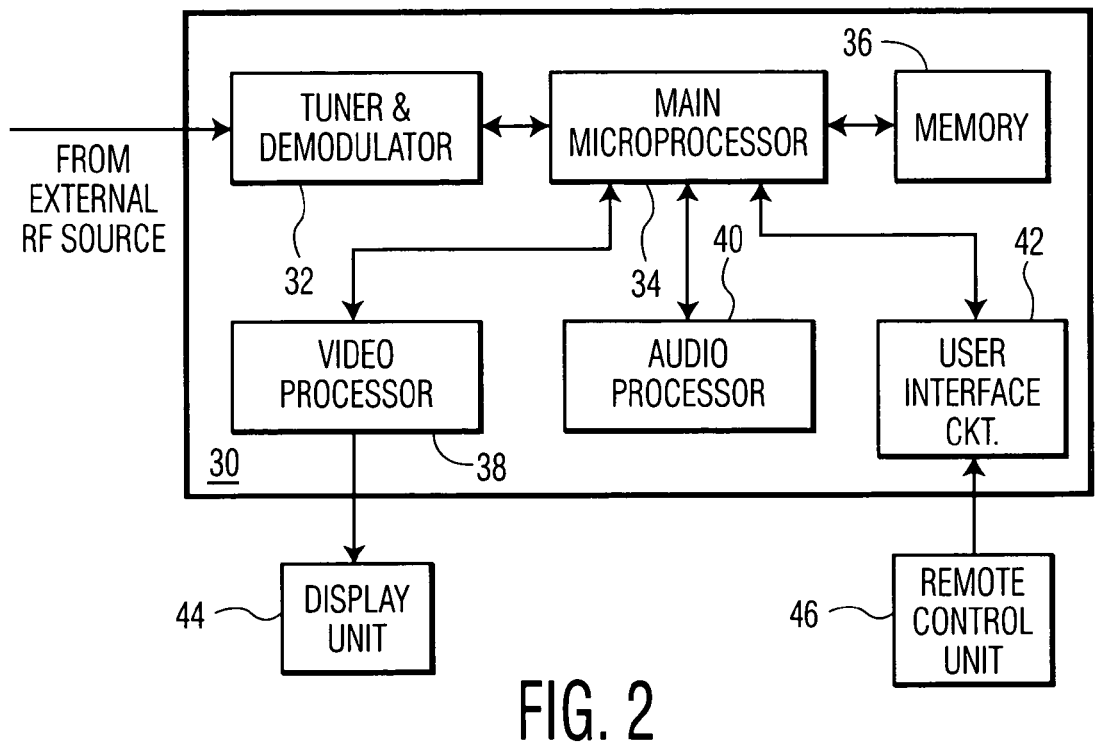
FIG. 2 depicts a functional block diagram of an exemplary set top box suitable for implementing the present invention.

FIG. 2 depicts a set top box suitable for implementing the present invention. As shown, set top box 30 includes tuner and demodulator 32 for retrieving an RF signal from an external source and converting the RF signal into a digital data stream. The data stream is provided for processing by main microprocessor 34. The main microprocessor coordinates and controls the general operation of set top box 30. Responsible for executing software to control the operation, main microprocessor 34 interfaces with memory 36, video processor 38, audio processor 40 and user interface circuitry 42. The program code and data reside in memory 36. The video and graphics are generated by video processor 38 and provided to display unit 44, which may be a television set. User commands from remote control unit 46 and front panel buttons (not shown) are directed to main microprocessor 34 by way of user interface circuitry 42.

Set top box 30 includes circuitry for selecting and displaying program guide information. As an example, the tuner in set top box 30 may be set to a special program guide channel which transmits only program guide information. The program guide information may be stored in memory 36. Main microprocessor 34 extracts portions of the stored program guide information for display in response to viewer control. The video processor generates a display format to show the program guide information as a menu on display unit 44.

Figure 5:
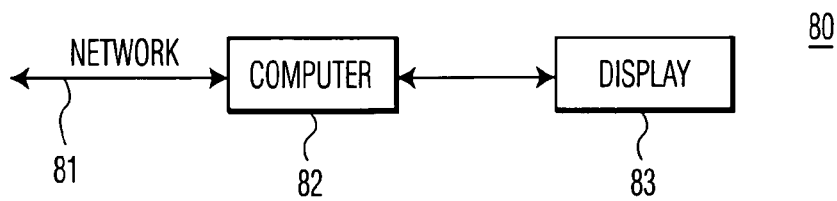
FIG. 5 depicts a functional block diagram of an apparatus suitable for implementing the present invention.

Further details of the components of the set top box are not discussed herein, since they are apparent to those skilled in the art. Any combination of hardware and software may be used to implement the set top box. The set top box is only one possible apparatus for implementing the present invention. For example, all or part of the program guide may be implemented in system 80 shown in FIG. 5. System 80 includes computer 82 coupled to network 81 and display 83. The network may include any medium carrying data streams containing program guide information. The network may be a global information network, such as the Internet. Electronic program guide features according to the present invention may also be implemented internal to a television receiver using the control microprocessor and on screen display (OSD) features of the receiver.

Remote control unit 46 using infrared signaling may direct the microprocessor to display a video program. Certain prompts selected on the remote control unit may be superimposed over the video program or may occupy the entire screen. For example, when selecting a program guide mode, the entire screen may be utilized and other video programming may not be displayed. By pressing a keypad on the remote control unit, the viewer may control the program guide display. The viewer may scroll through the program guide, as explained below, by highlighting and activating a time selection field on the menu being displayed. Although not shown, it will be appreciated that in addition to, or as a substitute, buttons may be provided on the set top box to similarly control the program guide display.

Figure 3:
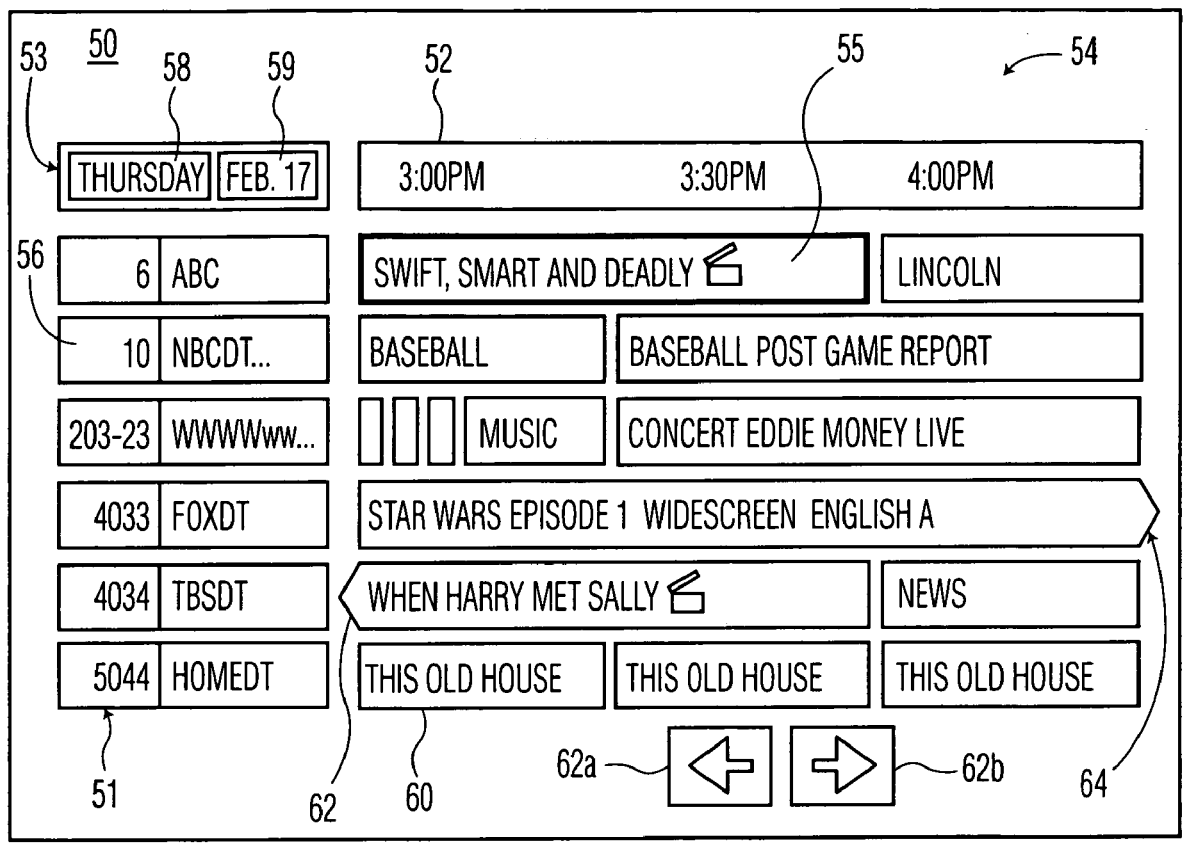
FIG. 3 depicts a display showing a program guide in accordance with the present invention.

A program guide in accordance with an exemplary embodiment of the invention is shown in FIG. 3. As shown, display screen 50 includes program guide 54 showing a table containing program guide information. The table has two axes. A vertical axis, generally designated as 51, contains a plurality of channel panels 56. Six channels are shown in the figure. A horizontal axis, generally designated as 53, contains day field 58, date field 59 and time panel 52. In the example shown, day field 58 contains "Thursday" as the day of the week and date field 59 contains "Feb. 17" as the date of the month. Time panel 52 shows a sequential 1.5 hour increment, from 3:00 PM to 4:30 PM, as an example. A program grid, generally designated as 60, lists titles of programs. Each title is listed in an entry corresponding to the channel transmitting the program, at the time represented by the position of the entry.

Tiles 62 and 64, which also contain entries of program titles, terminate at opposite respective ends into an arrow. The arrow pointing to the right in tile 64 indicates that the viewer may scroll or index the program guide to the next sequential 30 minute increment from the currently showing display. The arrow pointing to the left in tile 62 indicates that the viewer may scroll or index the program guide to a previous 30 minute portion from the currently showing display. It will be appreciated that the arrow in title 64 may disappear, when program guide 54 is displaying the latest time of transmission stored in memory 36. Similarly, the arrow in tile 62 may disappear, when the program guide is displaying the current time of the day.

Although not shown, a different grouping of channels on the vertical axis may be viewed by selecting the channel button on the remote control unit or by keying the numerical representation of the desired channel. In addition, the cursor may be moved vertically or horizontally with the remote control unit. As an example, FIG. 3 depicts cursor 55 highlighting the title of "Swift, Smart and Deadly". If the cursor is moved to the right, past the latest time shown, the next 30-minute span of time may be viewed; if the cursor is moved to the left, past the earliest time shown, a previous 30-minute span of time may be viewed.

Completing FIG. 3, there is shown page fields 62*a* and 62*b*, respectively, having opposing arrows. The viewer may move the cursor vertically downward by scrolling using the keypad on the remote control unit. After the cursor highlights page field 62*a*, for example, the viewer may move the cursor in the horizontal position to page field 62*b*. Activating page field 62*b* allows the viewer to move forward in time by a six-hour increment. Activating page field 62*a* allows the viewer to move backwards in time by a six-hour increment.

In the preferred embodiment of the invention, a conventional set top box and a conventional remote control unit may be used. In addition, the program guide displayed on display unit 44 may provide the same programming information as a conventional program guide. The improvement provided by the invention is a method and an apparatus for rapidly accessing guide information using time selection fields. The time selection fields may include one or more of the following: (1) a selectable day field, (2) a selectable page field and (3) a selectable date field. These are described below with reference to FIGS. 3 and 4.

The day field may be selected by the viewer by scrolling the cursor to day field 58, shown in FIG. 3. It will be appreciated that scrolling up/down or left/right may be implemented by pressing the appropriate direction key on the remote control unit or using buttons on the front panel of the set top box. Once the viewer has positioned the cursor on day field 58, scrolling forward or backwards by one day at a time may be initiated. By pressing an action key (for example, the ENTER key on the remote control unit), the day field may be activated. Next, the viewer may press the up-direction key to go forward by a day or the viewer may press the down-direction key to go backwards by a day. For example, day field 58 in FIG. 3 contains the day "Thursday". By pressing the up-direction key once, day field 58 is changed to "Friday". By pressing next the up-direction key again, day field 58 is changed to "Saturday". By pressing next the down-direction key, day field 58 returns to the previous day of "Friday". In this manner, the viewer may navigate the program guide in 24 hour increments.

The page field may be selected by the viewer by scrolling the cursor to either page field 62*a* or 62*b*. Assuming that the cursor is highlighting page field 62*b*, the viewer may move the program guide forward in time by a six-hour increment, by pressing once the action key on the remote control unit or on the front panel. Similarly, if the cursor is highlighting page field 62*a*, the viewer may move the program guide backwards in time by a six-hour increment upon pressing the action key once. If the action key is pressed twice, the program guide may be moved by a 12-hour increment. In this manner, the viewer may quickly access the program guide in another portion of the day.

The date field may be selected by the viewer by scrolling the cursor to date field 59. Once the cursor is highlighting the date field, the viewer may press the action key to activate this field. The viewer may then move the program guide by one week upon pressing the up-direction key once. For example, by pressing the up-direction key once, date field 59 is changed to "Feb. 24". By pressing next the down-direction key, date field 59 is changed back to "Feb. 17". In this manner, the viewer may quickly access the program guide one week ahead or one week back from the currently showing display.

Figure 4:
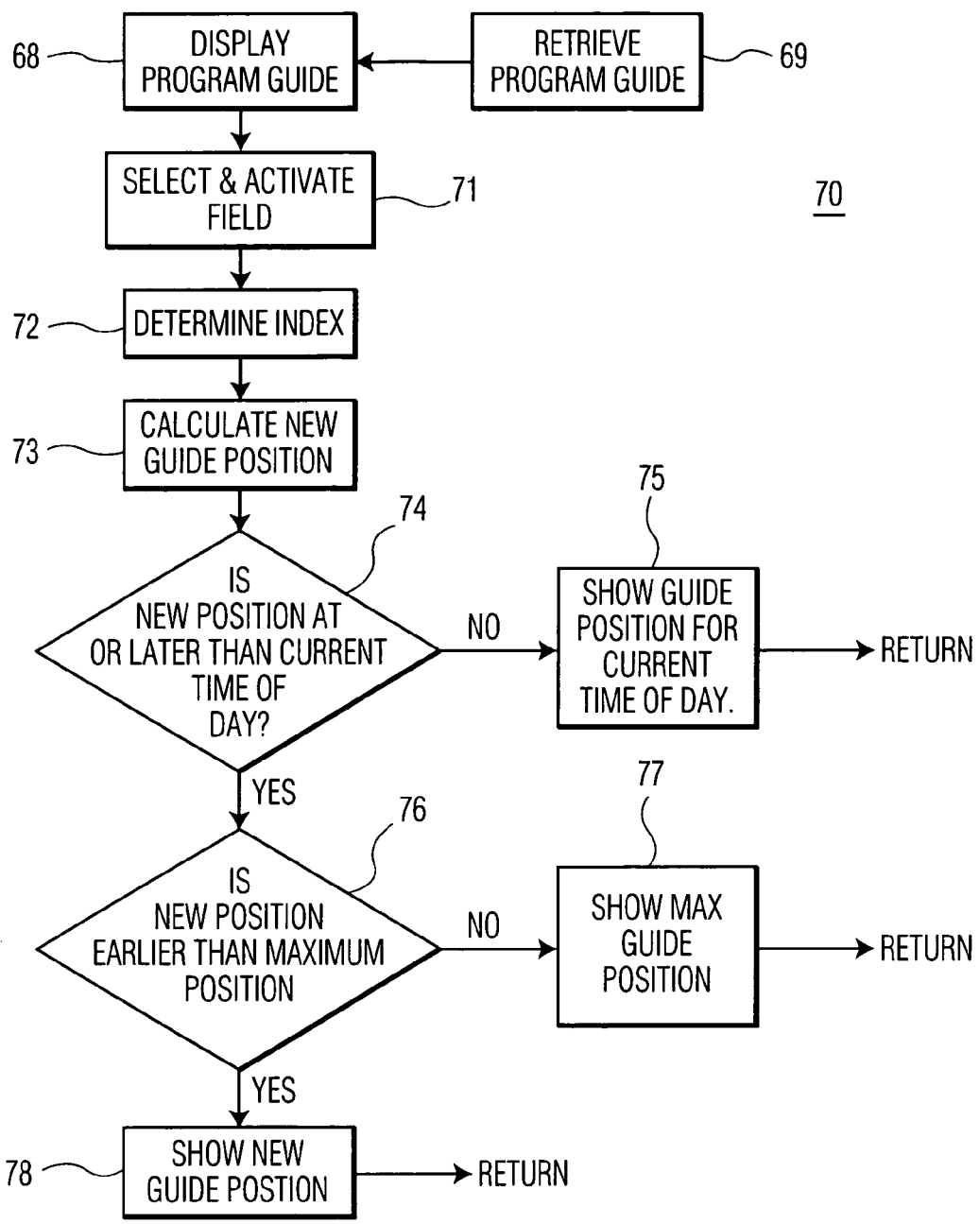
FIG. 4 is a flow diagram showing the method of the present invention.

FIG. 4 is a flow diagram showing method 70 for rapidly accessing the program guide information. As shown, process block 66 retrieves the program guide for a predetermined period from memory 36. The program guide includes, for example, program titles, broadcast times and assigned channels for a period of 90 minutes. An example of the program guide is shown in FIG. 3. The program guide is displayed by process block 68, preferably at startup or when commanded by the viewer using remote control unit 46. Preferably, main microprocessor 34 cooperates with video processor 38 and the guide information stored in memory 36 to provide the program guide of the type shown in FIG. 3.

Process block 71 selects one of the aforementioned fields. As described before, the viewer selects a field by moving the cursor and highlighting the desired field. When the desired field is highlighted, the viewer may activate the field by pressing an action key (for example ENTER) using remote control unit 46. Selection and activation of a field permits the viewer to index through variable times in the program guide. Activation of the day field (shown, for example, as day field 58 in FIG. 3) permits indexing by 24-hour increments. Activation of the page fields (shown, for example, as page fields 62a and 62b) permits indexing by six-hour increments. Activation of the date field (shown, for example, as date field 59) permits indexing by one week increments. If none of the fields is selected, indexing by 30-minute increments is activated to permit the viewer to navigate through the program guide by 30-minute increments. Indexing by 30-minute increments is typical in conventional program guides.

It will be appreciated that the aforementioned fields and their corresponding time indexing are exemplary. Other time increments may be implemented. For example, the page fields may increment (or decrement) by 12-hour time spans; the date field may increment (or decrement) by a 2-day (48-hour) interval or a 4-day (96-hour) interval.

Continuing the description of method 70, process block 72 determines the index based on the field selected and activated by the viewer. For example, if page field 62b (forward page) is selected and activated, process block 72 determines that the index is +6 hours; if, however, page field 62a (backwards page) is selected and activated, process block 72 determines that the index is −6 hours. If day field 58 is selected and activated and the scroll forward key is pressed on the remote control unit, process block 72 determines that the index is +24 hours; if the scroll backwards key is pressed, however, process block 72 determines that the index is −24 hours. Finally, if date field 59 is selected and activated and the scroll forward key is pressed on the remote control unit, process block 72 determines that the index is plus-one-week (+168 hours); if the scroll backwards key is pressed, however, process block 72 determines that the index is minus-one-week (−168 hours).

Process block 73 calculates the new guide position (time of transmission) in response to the index determined by block 72. If the new guide position is at or later than the current time of day, decision block 74 branches to decision block 76. If the new guide position is earlier than the current time of day, decision block 74 branches to process block 75. The program guide for current time of day is displayed by process block 75. For example, FIG. 3 shows the program guide for time of day of Thursday, February 17, 3:00 PM. Supposing that the current time of day is Thursday, February 17, 12:00 PM and the viewer attempts to index backwards by 24 hours, process block 75 displays the program guide for the current time of day (Thursday, February 17, 12:00 PM).

Decision block 76 determines whether the new guide position is earlier than the maximum guide position (latest time of transmission stored in memory 36). If the new guide position determined by process block 73 is earlier than the maximum guide position stored in memory 36, the method branches to process block 78 and displays the new guide position. If decision block 76 determines that the new guide position is at or later than the maximum guide position, the method branches to process block 77 and displays the maximum guide position. For example, supposing the maximum guide position (current time of transmission) is Saturday, February 19, 3:00 PM, and the current guide position (current time of transmission) is Saturday, February 19, 1:30 PM. If the user attempts to index six hours forward via the page button, the new guide position calculated is Saturday, February 19, 7:30 PM. Since that time exceeds the maximum guide position, however, the new guide position shown to the viewer is the maximum guide position of Saturday, February 19, 3:00 PM.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. In an apparatus for displaying program guide information and a cursor on a grid showing a channel axis and a time axis, with each program positioned at a location in the grid representing a channel of transmission and a corresponding time of transmission, the apparatus responsive to a user action command corresponding to a single action key associated with a user interface, a method for rapidly accessing the program guide information at a desired new time of transmission, comprising the steps of:
   (a) displaying the program guide information;
   (b) placing a plurality of time selection fields on the display, the plurality of time selection fields representing respective incremental time indexes having respectively different magnitudes, each time selection field configured to be activated responsive to receipt of the user action command corresponding to the single action key;
   (c) selecting one time selection field of the plurality of time selection fields by positioning the cursor on the one time selection field, wherein the plurality of time selection fields includes a page field, a day field and a date field and wherein the page field provides a multi-hour time index, the day field provides a 24-hour time index, and the date field provides a seven-day time index;
   (d) activating the selected time selection field to select the respective incremental time index responsive to receipt of the user action command corresponding to the single action key while the cursor is positioned on the one time selection field;
   (e) calculating a new time of transmission for display by adding the selected incremental time index to one of the times of transmission currently displayed; and
   (f) displaying the program guide information at the new time of transmission.

2. The method of claim 1 wherein step (d) determines a magnitude of the selected incremental time index and the method further includes the step of activating one of first and second direction inputs to determine an arithmetic sign of the selected incremental time index.

3. The method of claim 1, wherein step (f) includes displaying the program guide information at a current time of transmission, if the calculated new time of transmission is earlier than the current time of transmission.

4. The method of claim 1 wherein step (f) includes displaying the program guide information at a latest time of transmission, if the calculated new time of transmission is later than the latest time of transmission, the latest time of transmission corresponding to the latest program guide information stored in the apparatus.

5. The method of claim 1 wherein the apparatus is implemented in a set top box.

6. The method of claim 1 wherein the apparatus includes a computer coupled to a network for receiving program guide information from the network.

7. The method of claim 1, further including the step of assigning a value to at least one of the incremental time indexes of the respective time selection fields.

8. An apparatus for displaying program guide information and a cursor on a grid showing a channel axis and a time axis, with each program positioned at a location in the grid representing a channel of transmission and a corresponding time of transmission, the apparatus responsive to a user action command corresponding to a single action key associated with a user interface, the apparatus comprising a display for displaying the program guide information for a current time interval;

a memory device for storing the program guide information; and a processor for processing software for accessing the program guide information, the software including:

a plurality of time selection fields for selecting respective incremental time indexes responsive to receipt of the user action command corresponding to the single action key with the cursor positioned on the time selection field of the respective incremental time index to be selected, the respective incremental time indexes having respectively different magnitudes, wherein the plurality of time selection fields includes a page field, a day field, and a date field and wherein the selected incremental time index is a multi-hour incremental time index when the page field is selected, a 24-hour incremental time index when the day field is selected, and a seven-day incremental time index when the date field is selected;

a calculator for calculating a new time of transmission for display by adding the selected incremental time index to a time value in the current time interval;

wherein, the display displays the program guide information for the new time of transmission.

9. The apparatus of claim 8 wherein the time selection fields determine a magnitude of the selected incremental time index and the apparatus further includes first and second direction inputs for selecting an arithmetic sign of the selected incremental time index.

10. The apparatus of claim 8 wherein the calculator limits the program guide information at current time of transmission, if the calculated new time of transmission is earlier than the current time of transmission.

11. The apparatus of claim 8 wherein the calculator limits displaying the program guide information at a latest time of transmission, if the calculated new time of transmission is later than the latest time of transmission, the latest time of transmission corresponding to the latest program guide information stored in the memory device.

12. The apparatus of claim 11 wherein the apparatus is a set top box.

13. The apparatus of claim 8, wherein the processor further includes software for assigning a value to at least one of the incremental time indexes of the respective time selection fields.

* * * * *